United States Patent [19]

Hackamack

[11] Patent Number: 4,525,802
[45] Date of Patent: Jun. 25, 1985

[54] PORTABLE ELECTRONIC TESTING APPARATUS

[75] Inventor: Paul Hackamack, Torrance, Calif.

[73] Assignee: Cache Technology Corporation, Valencia, Calif.

[21] Appl. No.: 378,185

[22] Filed: May 14, 1982

[51] Int. Cl.³ .............................................. G01R 15/12
[52] U.S. Cl. .................................... 364/900; 361/395; 361/399
[58] Field of Search ......................... 364/708, 200, 900; 324/73 R, 73 A, 158 R; 371/29, 17; 361/395, 399

[56] References Cited

U.S. PATENT DOCUMENTS

| | | | |
|---|---|---|---|
| 3,659,273 | 4/1972 | Knauft et al. | 371/29 X |
| 4,039,813 | 8/1977 | Kregness | 371/29 X |
| 4,196,386 | 1/1980 | Phelps | 371/20 X |
| 4,200,224 | 4/1980 | Flint | 324/73 R X |
| 4,212,075 | 7/1980 | Cleversey et al. | 324/73 AT X |
| 4,241,416 | 12/1980 | Tarczy-Hornoch | 364/900 |
| 4,348,636 | 9/1982 | Doundoulakis | 324/73 R |
| 4,354,268 | 10/1982 | Michel et al. | 371/20 |

OTHER PUBLICATIONS

Cukier et al., "Test Device for Microprocessor Programming", *IBM Technical Disclosure Bulletin*, vol. 21, No. 10, Mar. 1979, pp. 4076-4077.
Kellerman et al., "Program Debug for Microprocessors", *IBM Technical Disclosure Bulletin*, vol. 20, No. 4, Sep. 1977, p. 1358.

*Primary Examiner*—Gareth D. Shaw
*Assistant Examiner*—Daniel K. Dorsey
*Attorney, Agent, or Firm*—Charles H. Schwartz; Ellsworth R. Roston

[57] ABSTRACT

A portable electronic testing apparatus for examining the data at a selected address within a microprocessor system and with the microprocessor system including a receptacle for receiving a CPU having particular electrical connections. An electrical socket, having the particular electrical connections for receiving the CPU, provides electrical contact to the CPU when the CPU is removed from the microprocessor system and plugged into the electrical socket. A connector assembly is interconnected with the electrical socket with the connector assembly including a plug simulating the electrical connections of the CPU. The plug is plugged into the receptacle included in the microprocessor system after the CPU is removed from the microprocessor system so as to electrically reconnect the CPU within the operation of the microprocessor system. Address selection switches provide a selection of the address of data to be examined. A comparator is coupled to the electrical socket and thereby to the CPU when the CPU is removed from the microprocessor system and plugged into the electrical socket and is also coupled to the address selection switches for comparing the addresses of the data within the microprocessor system with the selected address of the data to be examined. The comparator produces a signal in accordance with a match between the compared addresses. A display is coupled to the electrical socket and thereby to the CPU when the CPU is removed from the microprocessor system and plugged into the electrical socket and is responsive to the signal from the comparator for displaying the data at the selected address within the microprocessor system.

19 Claims, 3 Drawing Figures

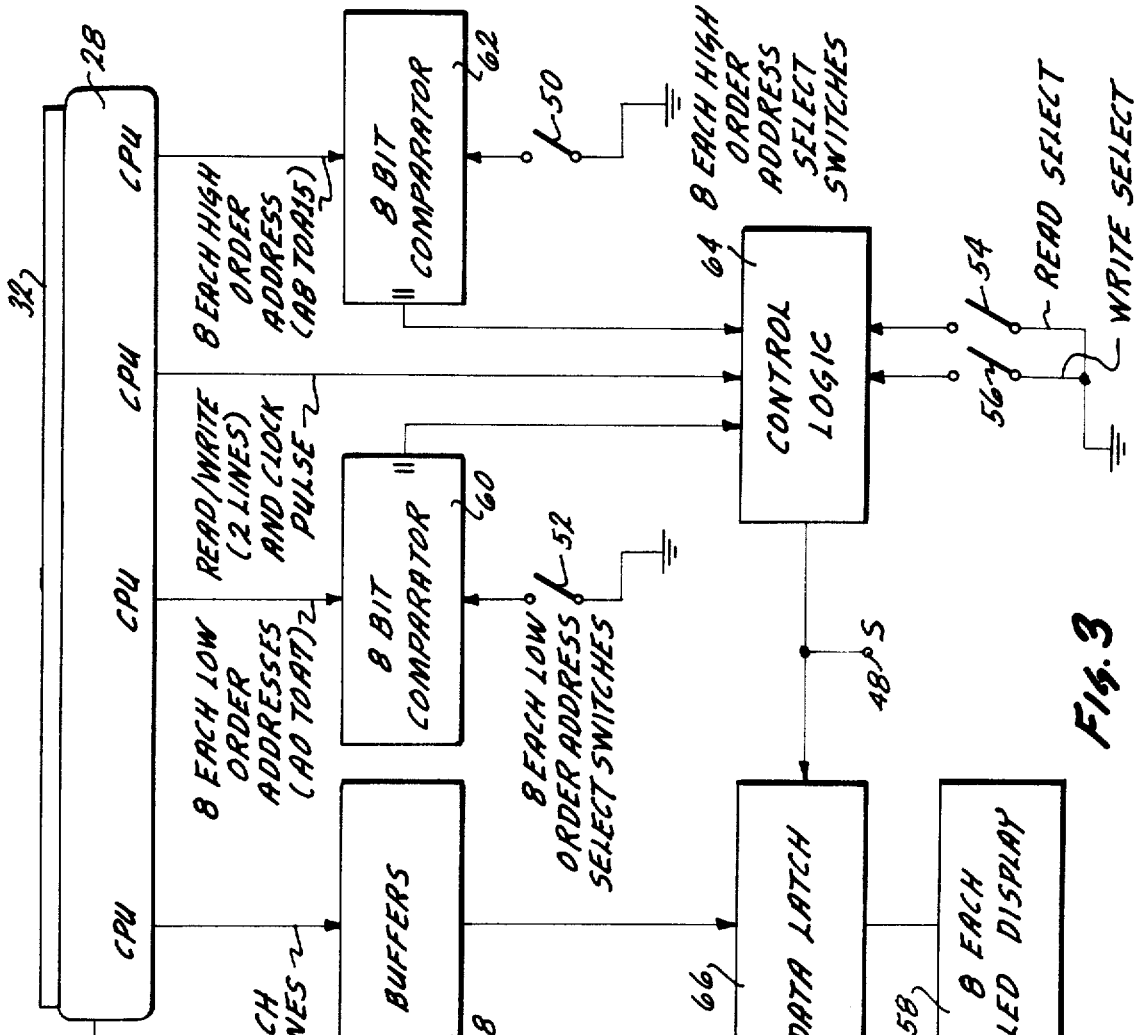
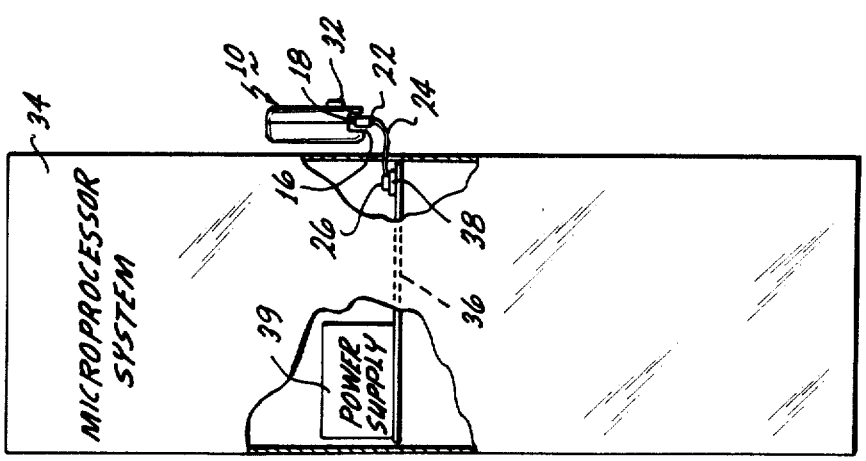

PORTABLE ELECTRONIC TESTING APPARATUS

BACKGROUND OF THE INVENTION

1. Field of the Invention

The present invention is directed to an electronic testing device and specifically an electronic testing device for examining data at a selected address within the particular address range of the microprocessor system. In particular, the present invention provides for a display of a byte of memory written to and/or read from a microprocessor system.

2. Description of the Prior Art

It is often desirable when operating a microprocessor system to be able to anaylze whether particular data is present at a particular address within the microprocessor system. For example, when developing a microprocessor based system or developing the software for the system, it is often necessary to be able to determine whether, during the operation of the microprocessor system, the desired data is either being written to and/or read from a particular address. In addition, when trouble-shooting the microprocessor based system in the field, it is again often desirable to be able to determine the operation of the microprocessor system through the presence of data at a particular address.

In the prior art, various types of testing equipment have been used to make these determinations. In general, these prior art testing devices are large and expensive since these prior art devices are substantially self-contained logic analyser or emulator units. The prior art devices are generally inappropriate for in the field trouble-shooting and difficult to use for developing systems and software.

SUMMARY OF THE INVENTION

The present invention is directed to an electronic testing device for use in testing microprocessor based systems. Specifically, the electronic testing device of the present invention is a relatively simple and inexpensive device which is coupled to the microprocessor system in a parasitic fashion. Specifically, the testing device of the present invention is coupled to the CPU included within the microprocessor system and uses the existing power supply for the microprocessor system. The testing device of the present invention provides for an examination of data at a selected address so that the examined data can be compared to the expected data at that address as stated in a memory map of data for the particular microprocessor system being tested.

The electronic testing device of the present invention includes a plurality of address select switches which may be set to the desired address of the data which is to be examined. The existing CPU in the microprocessor system is removed from its receptacle within the microprocessor system and is plugged into an electrical socket which forms part of the testing device of the present invention. The electrical socket has the same electrical connections as the CPU and its receptacle within the microprocessor system. A connector extends from the testing device of the present invention and includes a plug which has the same electrical connections as the CPU so as to simulate the CPU. The plug is plugged into the receptacle in the microprocessor system after the CPU is removed and plugged into the electrical socket. In this way, the CPU is reconnected back into the microprocessor system but with the electronic testing device of the present invention now connected across the CPU to both receive electrical power from the microprocessor system and to fully monitor data being written to and/or read from the CPU.

In addition to the address select switches to select the address of the particular data to be examined, the testing device also includes read/write select switches to control the examination of the data at the particular selected address when the data is written to and/or read from the CPU. The selected data is then displayed on a plurality of LED's to thereby provide for a visual display of the data under examination. The data that is displayed may now be compared to the expected data for the particular selected address as determined from the specific memory map supplied for the particular microprocessor system under examination.

The monitoring of the data is accomplished using comparators which compare the addresses of the data flowing to and from the CPU under normal operation relative to the selected address as determined by the address select switches. When an address match occurs, a match signal is coupled to control logic. In addition, the read/write select switches are coupled to the control logic to provide an appropriate output signal to control the capture and display of the data at the particular selected address. The displayed data may then be compared to the expected data for the particular selected address in accordance with the individual memory map for the particular microprocessor system under test. The displayed data, therefore, can be used to provide trouble-shooting, if there is improper operation of the microprocessor system, or to help develop the hardware or the software for the microprocessor system.

A BRIEF DESCRIPTION OF THE DRAWINGS

A clearer understanding will be had with reference to the following description and drawings wherein:

FIG. 2 illustrates in more detail how the electronic testing device of the present invention is coupled in a parasitic fashion to the microprocessor system under test, and FIG. 3 is a block diagram of the electronic components forming the electronic testing device of the present invention.

DESCRIPTION OF THE PREFERRED EMBODIMENT

Figure 1:
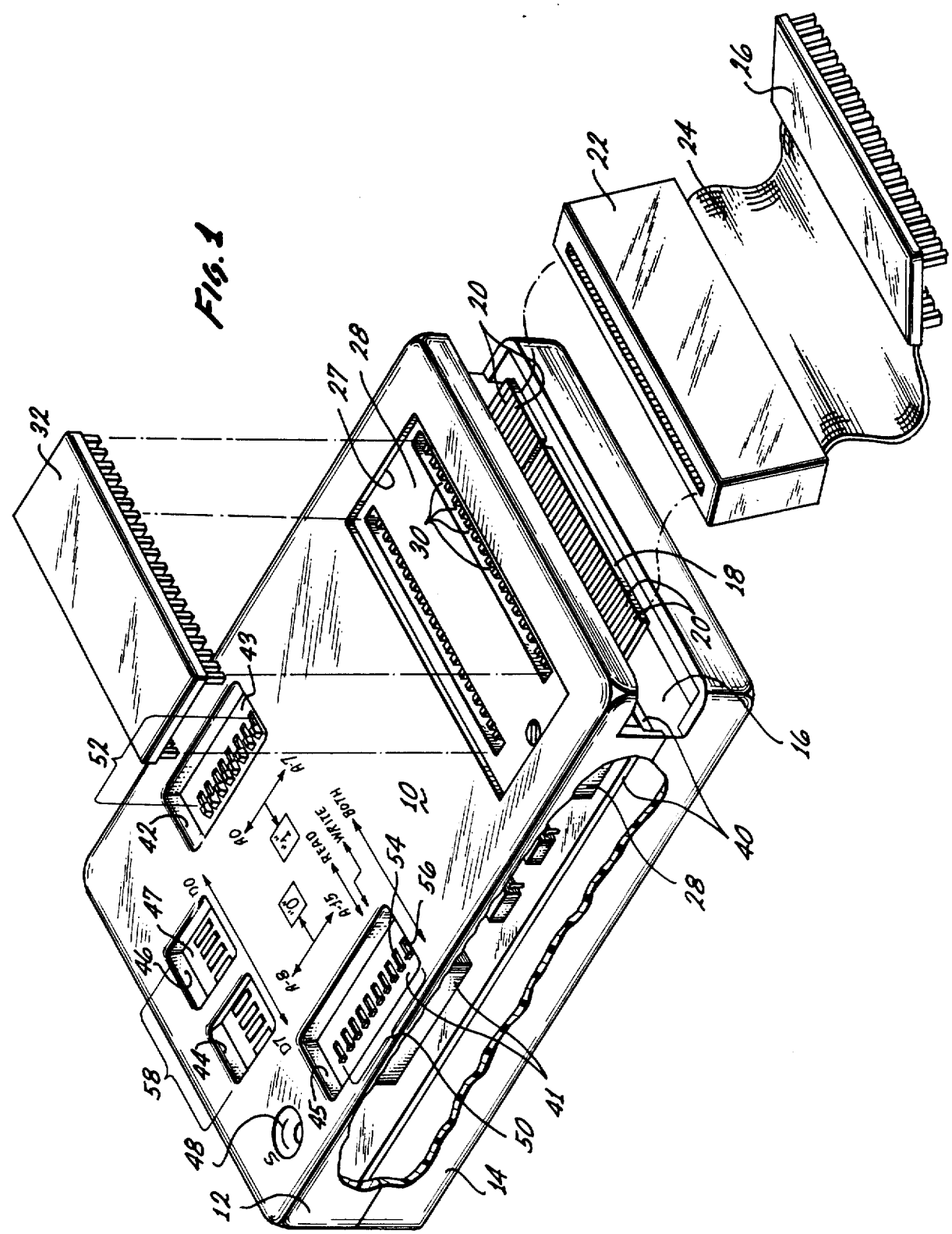
FIG. 1 is a front perspective view of an electronic testing device constructed in accordance with the teachings of the present invention and including an associated connector assembly and showing a CPU from a microprocessor system under test.

In FIG. 1, a perspective view is shown of the external configuration (partially broken away) of an electronic testing device constructed in accordance with the teachings of the present invention. The electronic testing device 10 includes an upper and lower housings 12 and 14 which fit together to form an enclosed space. Located within the enclosed space are the various electronic components, a block diagram of which is shown in FIG. 3. A relieved portion 16 at one end of the testing device 10 allows for a connector board 18 to extend out from the interior of the testing device. The connector board 18 includes spaced, conductive areas 20 forming a male connector to mate with a complementary female connector 22 and with both including complementary electrical connections. Extending from the female connector 22 is a flexible ribbon cable 24 including a plurality of wires forming electrical connections complementary to the individual conductive areas 20. Attached to the wires is a plug 26 including a plurality of pins so as to simulate the CPU of the microprocessor system under test. The female connector 22, flexible ribbon cable 24 and plug 26, together form a connector assembly to innerconnect the testing device 10 to the microprocessor system under test.

The upper housing 12 includes a number of openings to expose particular portions of the electronic testing device. Specifically, an opening 27 exposes an electrical socket 28. The socket 28 includes a plurality of electrical connections 30 to allow a CPU 32 from the microprocessor system under test to be plugged into the socket 28. The connector board 18 has the same electrical connections as the socket 28 and the CPU 32 so that the connector assembly can reconnect the CPU back into the microprocessor system.

In particular, the electronic testing device of the present invention is coupled to the microprocessor system under test in a parasitic fashion. As shown in FIG. 2, a microprocessor system 34 under test includes a circuit board 36 which normally includes the CPU 32 plugged into a receptacle 38 which includes electrical power connections to receive power from a power supply 39. In order to test the microprocessor system, the CPU 32 is removed from the receptacle 38 and plugged into the electrical socket 28 in the electronic testing device 10 as shown in FIG. 2. The connector assembly and specifically the plug 26 of the connector assembly is then plugged into the socket 38 of the microprocessor system 34. The female plug is also plugged into the electronic testing device and specifically receives the board connector 18.

At this point, the CPU 32, through the connector assembly, is reconnected back within the microprocessor system 34 and will perform in its normal fashion within the microprocessor system 34. However, the electronic testing device is now also coupled across the CPU 32 to monitor the operation of the microprocessor system 34. Additionally, the electronic testing device 10 uses the power normally supplied to the CPU 32 through the receptacle 38 by the power supply 39 to also power all of the electronic components within the electronic testing device 10 because of the interconnection of the testing device 10 and the microprocessor system 34. The electronic testing device of the present invention is therefore truly parasitic to the microprocessor system and does not need its own external power supply which greatly simplifies the construction and size of the testing device. This allows the testing device of the present invention to be easily used in the field for trouble-shooting and also to be easily used by an engineer when developing the hardware or software for a microprocessor system.

The electronic testing device 10 includes, within the upper and lower housing, a printed circuit board 40, one edge portion of which forms the connector 18. The board 40 supports the various components, as shown in FIG. 1, and with the upper housing 12 including a number of openings to allow access to particular components. Specifically, the opening 27 allows access to the socket 28 which is mounted on the board 40. An opening 45 allows access to a switch unit 41 mounted on the board 40. The unit 41 includes a plurality of switches 50 to control the high order address select. In addition, the unit 41 includes switches 54 and 56 to control read and/or write selection of the selected data. In addition, an opening 42 provides access to a switch unit 43 mounted on the board 40. The unit 43 includes a plurality of switches 52 to control the low order address select. A pair of side by side openings 44 and 46 provides access to a visual display unit 47 mounted on the board 40. The unit 47 includes a plurality of LED displays 58. An opening 48 forms a test point giving access to a position on the board 40 wherein a sync-pulse is produced, as further shown in FIG. 3.

Particular identifying indicia appear on the upper surface of the housing 12 adjacent to the openings 45, 42, 44, 46 and 48 so as to identify the function of the components mounted on the board 40 and exposed within these openings. Specifically, identifying indicia "A0-A7" are adjacent the plurality of switches 52 which form the low order address select switches. Identifying indicia "A8-A15" are adjacent the plurality of switches 50 which form the high order address select switches. The indicia "READ" is adjacent the switch 54 which is used to select the read function. The indicia "WRITE" is adjacent the switch 56 which is used to select the write function. The indicia "BOTH" is below the opening 45 to represent both the read and write function being selected by the switches 54 and 56. Identifying indicia "D0-D7" is shown adjacent the openings 44 and 46 which indicia designate the group of eight (8) LED displays 58 which display the data under examination. The identifying indicia "S" is adjacent the opening 48 to represent the test point where the sync-pulse appears whenever data is written to and/or read from CPU at the selected address.

FIG. 3 is a block diagram of the electronic system included within the electronic testing device 10 of the present invention. The testing device includes a pair of eight bit comparators 60 and 62 to provide for a comparison between the selected address and the address information provided to the CPU 32 included in the microprocessor 34. In particular, in using the electronic testing instrument of the present invention, the user would refer to a memory map which is individual to the particular microprocessor system under test. This memory map provides a record of the proper data which should appear at particular addresses during the normal operation of the microprocessor system.

The user, therefore, selects a particular address in order to examine a particular byte of data which should be present at to that address when the microprocessor system is operating. Typically, if the CPU operates on bytes of data each representing eight (8) bits, the address structure is sixteen (16) bits. This sixteen (16) bit address structure is subdivided into the eight (8) low order and eight (8) high order addresses. The actual address of data to be examined is preselected by the user by the appropriate positions of the low (A0-A7) and high (A8-A15) order address select switches 52 and 50 respectively.

The comparators 60 and 62 also receive directly the address lines A0-A7 and A8-A1 5 for the data flowing through the CPU 32 and this address information is compared with the selected address. When the comparators 60 and 62 find a match between the selected address and the address lines provided from the CPU 32, an address match output signal from each of the comparators is supplied to control logic 64. In addition to the match output signals from the comparators, the control logic 64 also receives as inputs, signals representing the position of the read select switch 54 and the write select switch 56. The read/write line for the data flowing through the CPU 32 and a clock-pulse is also supplied from the CPU 32 to the control logic 64. Depending upon the comparison of the position of the read switch 54 and the write switch 56 with the read/write line from the CPU 32, the control logic 64 provides an output control signal to control the capture of the data in accordance with the selected address. For example, if both the read switch 54 and the write switch 56 are activated, then the data read from and the data written to the CPU 32 at the selected address is captured.

Specifically, the control signal from the control logic 64 is applied to a store input at a data latch 66. The data latch 66 receives the data on the eight (8) data lines from the CPU 32 through buffers 68. The data latch 66 thereby provides output display signals representative of the data on the eight (8) data lines at the particular selected address. The data to be examined is thereby presented for display on the eight (8) LEDs 58. In particular, an LED that is "ON" or lighted represents a data line that was "HIGH" or a binary "1" at the time the data latch 66 received the control signal. Conversly, an LED that is "OFF" or unlighted represents a data line that was "LOW" or a binary "0". The displayed data may now be compared with the information known to the user from the memory map so as to determine whether the displayed data at the particular select address is proper. The control signal from the control logic 64 may also be used to provide a sync-pulse at the test point 48 which sync-pulse thereby represents whenever data is written to or read from the selected address.

It can be seen, therefore, that the electronic testing device of the present invention provides a testing of a microprocessor system and with the microprocessor system operating in its normal fashion and with the electronic testing device being coupled in a parasitic fashion across the microprocessor system by removing the CPU from the microprocessor system, plugging the CPU into an electrical socket forming part of the electronic testing device, and then reconnecting the CPU back into the microprocessor system with a connector assembly. This allows the testing device of the present invention to use the power supplied by the microprocessor system to the CPU which is now reincorporated within the microprocessor system.

The design of the electronic testing device of the present invention allows for a relatively simple and inexpensive structure both physically and electronically and allows the user to rapidly examine data at various selected addresses to determine whether the data is proper in accordance with predetermined data information contained in the memory map for the particular microprocessor system.

The invention has been illustrated with reference to a particular type of CPU having a sixteen (16) bit address normally ly divided into a high order and a low order address and with each byte of memory represented by eight (8) bits of data. It will be appreciated that other microprocessor systems using CPU's of a differing relationship may also be used. In addition, the CPU 32 is represented in a generalized form but it is to be appreciated that different CPU's have different pin configurations and that the socket 28 and the corresponding connector assembly will be adapted to operate in conjunction with a particular CPU. Other configurations for the socket 28 and the connector assembly may be used to provide for different CPU's being tested.

Although the present invention has been described with reference to a particular embodiment, it is to be appreciated that various adaptations and modifications may be made and the invention is only to be limited by the appended claims.

I claim:

1. A portable electronic testing apparatus for examining data present at a selected address during the operation of a microprocessor system and with the microprocessor system including a receptacle for receiving a CPU and with both the receptacle and CPU having the same particular electrical connections, the testing apparatus including, an electrical socket having the same particular electrical connections for receiving the CPU and providing electrical contact to the CPU when the CPU is removed from the microprocessor system and plugged into the electrical socket, a connector assembly interconnected with the electrical socket, the connection assembly including a plug simulating the electrical connections of the CPU and with the plug for plugging into the receptacle included in the microprocessor system after the CPU is removed from the microprocessor system so as to electrically reconnect the CPU within the operation of the microprocessor system, address selection means for providing a selection of the address of data to be examined, comparator means coupled to the electrical socket and thereby to the CPU when the CPU is removed from the microprocessor system and plugged into the electrical socket and also coupled to the address selection means for comparing the address of the data within the microprocessor system with the selected address of the data to be examined and for producing a signal in accordance with a match between the compared addresses, display means coupled to the electrical socket and thereby to the CPU when the CPU is removed from the microprocessor system and plugged into the electrical socket and responsive to the signal from the comparator means for displaying the data at the selected address within the microprocessor system, and read/write selection means for providing a selection of data written to and/or read from the CPU at the selected address.

2. The portable electronic testing apparatus of claim 1 wherein the address selection means and the read/write selection means include manually operated switches for providing the selections.

3. The portable electronic testing apparatus of claim 1 wherein the display means includes a plurality of LEDs for visually displaying the data at the selected address.

4. The portable electronic testing apparatus of claim 1 wherein the connector assembly is separate from the electronic testing apparatus and includes means for removably coupling the connector assembly to the electrical socket 5. The portable electronic testing apparatus of claim 1 wherein the particular electrical connections for the CPU include connections for electrical power from a microprocessor system power supply and with the electronic testing apparatus powered by the microprocessor system power supply through the CPU electrical power connections.

6. The portable electronic testing apparatus of claim 1 wherein the display means additionally includes a data storage means for receiving the data at the selected address and for storing the data at the selected address for display in accordance with the reception of the signal from the comparator means.

7. The portable electronic testing apparatus of claim 1 wherein the address selection means includes high order and low order address selection switches.

8. The portable electronic testing apparatus of claim 1 additionally including control logic coupled to the comparator means for producing the signal in accordance with a match between the compared addresses and additionally including read/write selection means coupled to the control logic for providing a selection of data written to and/or read from the CPU at the selected address.

9. The portable electronic testing apparatus of claim 8 additionally including means coupled to the control logic for providing an external test point to provide a sync-pulse in accordance with the selection of data written to and/or read from the CPU at the selected address.

10. The portable electronic testing apparatus of claim 1 additionally including a housing for mounting and supporting components forming the testing apparatus and with portions of the housing relieved to give access to particular components including the electrical socket, address selection means and display means.

11. A portable electronic testing apparatus for examining data present at a selected address during the operation of a CPU included in a microprocessor system and with the CPU having particular electrical connections, the testing apparatus including
   means having the same particular electrical connections as the CPU for coupling to the CPU and providing electrical contact to the CPU,
   address selection means for providing a selection of the address of data to be examined,
   read/write selection means for providing a selection of data written to and/or read from the CPU at the selected address,
   comparator means coupled to the means providing electrical contact to the CPU and also coupled to the address selection means for comparing the address of the data within the CPU with the selected address of the data to be examined and for producing a comparator signal in accordance with a match between the compared addresses,
   control logic coupled to the comparator means and to the read/write selection means for producing a control signal in accordance with a match between the compared addresses and additionally in accordance with the selection of data written to and/or read from the CPU at the selected address, and
   a display means coupled to the means providing electrical contact to the CPU and responsive to the signal from the control logic for displaying the selected read and/or write data at the selected address within the CPU.

12. The portable electronic testing apparatus of claim 11 wherein the address selection means and the read/write selection means include manually operated switches for providing the selections.

13. The portable electronic testing apparatus of claim 11 wherein the display means includes a plurality of LEDs for visually displaying the data at the selected address.

14. The portable electronic testing apparatus of claim 11 wherein the particular electrical connections for the CPU include connections for electrical power from a microprocessor system power supply and with the electronic testing apparatus powered by the microprocessor system power supply through the CPU electrical power connections.

15. The portable electronic testing apparatus of claim 11 wherein the display means additionally includes a data storage means for receiving the data at the selected address and for storing the data at the selected address for display in accordance with the reception of the control signal from the control logic.

16. The portable electronic testing apparatus of claim 11 wherein the address selection means includes high order and low order address selection switches.

17. The portable electronic testing apparatus of claim 11 additionally including a housing for mounting and supporting components forming the testing apparatus and with portions of the housing relieved to give access to particular components including the address selection means and display means.

18. The portable electronic testing aparatus of claim 11 additionally including means coupled to the control logic for providing an external test point to provide sync-pulse in accordance with the selection of data written and/or read from the CPU at the selected address.

19. The portable electronic testing apparatus of claim 11 wherein the microprocessor system includes a receptacle for receiving the CPU and wherein the means having the particular electrical connections includes an electrical socket having the same particular electrical connections as the CPU for receiving the CPU and providing electrical contact to the CPU when the CPU is removed from the microprocessor system and plugged into the electrical socket and a connector assembly interconnected with the electrical socket, the connector assembly including a plug simulating the electrical connections of the CPU and with the plug for plugging into the receptacle included in the microprocessor system after the CPU is removed from the microprocessor system so as to electronically reconnect the CPU within the operation of the microprocessor system.

* * * * *